United States Patent [19]

Watanabe et al.

[11] Patent Number: 5,039,719

[45] Date of Patent: Aug. 13, 1991

[54] GLASS FIBER REINFORCED THERMOPLASTIC RESIN COMPOSITION

[75] Inventors: Makoto Watanabe, Yokkaichi; Akio Kisaichi, Tsu, both of Japan

[73] Assignees: Monsanto Kasei Company, Tokyo; Nippon Glass Fiber Co., Ltd., Mie, both of Japan

[21] Appl. No.: 556,001

[22] Filed: Jul. 16, 1990

[30] Foreign Application Priority Data

Jul. 14, 1989 [JP] Japan ................... 1-181789

[51] Int. Cl.⁵ ............................................. C08K 9/06
[52] U.S. Cl. ................................... 523/213; 523/205; 524/504; 525/74; 525/78
[58] Field of Search .................. 523/527, 205, 213; 524/714, 789, 504; 525/74, 78

[56] References Cited

U.S. PATENT DOCUMENTS

| | | | |
|---|---|---|---|
| 3,974,234 | 8/1976 | Brinkmann et al. | 525/301 |
| 4,421,892 | 12/1983 | Kasahara et al. | 525/183 |
| 4,423,186 | 12/1983 | Grigo et al. | 525/183 |

*Primary Examiner*—Paul R. Michl
*Assistant Examiner*—U. K. Rajguru
*Attorney, Agent, or Firm*—Wenderoth, Lind & Ponack

[57] ABSTRACT

A glass fiber-reinforced thermoplastic resin comprising:
(i) 100 parts by weight of a blend of a polyamide and a styrene copolymer which in turn is a blend of a high impact polymer such as ABS and a carboxylated styrene copolymer and, optionally, a styrene copolymer with acrylonitrile or MMA;
(ii) 5 to 100 parts by weight of glass fiber reinforcement, which glass fiber has a coat on it of a binder which comprises a polymeric binder composition and a silane binder, both being specified.

18 Claims, No Drawings

GLASS FIBER REINFORCED THERMOPLASTIC RESIN COMPOSITION

BACKGROUND OF THE INVENTION

1. Field of the art

This invention relates to reinforcement of a thermoplastic resin composition with glass fibers. More particularly, the present invention relates to a glass fiber reinforced thermoplastic resin composition capable of giving a molded article endowed with both excellent rigidity and impact resistance, which composition is obtained by formulating a glass fiber obtained by use of a mixture of a specific polymer and a specific silane compound as a binder or a sizing agent in a resin mixture comprising a polyamide resin and an aromatic vinyl copolymer resin, and also to said glass fiber.

2. Related art

Polyamide resins have excellent properties in such as abrasion resistance, electrical characteristics, mechanical strength and chemical resistance, and their formed or molded products have been employed in the art as engineering plastics for various kinds of mechanical parts. These polyamide resins also have the drawbacks of great water absorption, and small impact resistance, particularly small notched impact strength. On the other hand, as compared with styrene polymers which are resins for general purpose, they have also the drawbacks of inferior heat resistance under high load and moldability. Since polyamide resins have such drawbacks, their uses as engineering plastics have been limited, and it has in some cases been found that the excellent characteristics inherent in polyamide resins are not fully enjoyed.

As the method for improving these drawbacks of polyamide resins, for example, it has been known to process them into blends with acrylonitrile-butadiene-styrene copolymers (ABS resin) (see, for example, Japanese Patent Publication No. 23476/1963). However, the blended composition of a polyamide resin and an ABS resin is inferior in compatibility of the both component resins, and when formed or molded into an article, there may appear such drawbacks that layered peeling phenomenon due to poor mixing occurs, or that the mechanical strength such as tensile strength is markedly lowered. For this reason, as the method for improving compatibility of a polyamide resin with a styrene resin such as ABS resin, it has been proposed to formulate a styrene polymer containing an $\alpha, \beta$-unsaturated dicarboxylic acid anhydride as the third component into the blend of the both resins (see, for example, Japanese Patent Publication No. 47304/1985). By formulation of such third component, a resin composition with a polyamide resin and a styrene polymer physically finely dispersed in each other can be surely obtained. However, it appears that the impact resistance of the resin composition comprising the three components is not substantially improved.

Also, for enhancing the rigidity of these resins, there has been also a proposal about a resin composition in which glass fibers can be formulated (see, for example, Japanese Laid-open Patent Publication No. 165451/1988). However, it appears that only a resin composition with extremely low impact resistance has been obtained by mere formulation of the glass fibers as such.

As described above, in resin compositions of polyamide resins and styrene polymers, there may have been obtained no resin materials having excellent properties of the two resins, and also endowed with excellent rigidity and impact resistance under the present situation.

Glass fibers are known in the art as, for instance, reinforcing agents for plastics. Glass fibers are produced with the use of a binder or a sizing agent for preventing balooning of the as-spun glass fibers or for affording the fibers desired characteristics.

SUMMARY OF THE INVENTION

The present inventors have studied intensively in order to solve the various drawbacks possessed by the resin compositions of polyamide resins and styrene copolymer resins as described above, and consequently accomplished the present invention. More specifically, the present invention is to provide a glass fiber reinforced thermoplastic resin composition which can give a formed or molded product having both excellent rigidity and impact resistance by formulating a glass fiber obtained by selected binders into a combination of a polyamide resin and an aromatic vinyl copolymer resin.

The glass fiber-reinforced thermoplastic resin composition according to one aspect of the present invention comprises 100 parts by weight of a thermoplastic resin mixture (I) comprising 20 to 80% by weight of a polyamide resin (I-1) and 20 to 80% by weight of an aromatic vinyl copolymer resin (I-2) comprising copolymer resins (A) to (C) shown below, the total of the polyamide resin and the aromatic vinyl copolymer resin being 100% by weight, and 5 to 100 parts by weight of glass fiber (II) having a coat thereon of a binder which is a mixture of a polymeric binder component (a) or (b) and a silane binder component (c) shown below:

(A) 60 to 99.99 parts by weight of a rubber-reinforced styrene graft copolymer;

(B) 0.01 to 40 parts by weight of a copolymer resin comprising (1) 30 to 80% by weight of an aromatic vinyl monomer component, (2) 0.1 to 30% by weight of (i) an unsaturated dicarboxylic acid anhydride, (ii) an unsaturated carboxylic acid, (iii) an unsaturated carboxylic acid metal salt, (iv) an unsaturated carboxylic acid ester or (v) an unsaturated carboxylic acid amide, (3) 0 to 65% by weight of a maleimide monomer component and (4) 0 to 40% by weight of another vinyl monomer component copolymerizable therewith, the total of these monomer components being 100% by weight;

(C) 0 to 15 parts by weight of a copolymer resin comprising 60 to 90% by weight of an aromatic vinyl monomer component, 0 to 40% by weight of a vinyl cyanide monomer component and 0 to 40% by weight of methyl methacrylate component, the total of these monomer components being 100% by weight; provided that the total of the rubber reinforced styrene graft copolymer resin (A), the copolymer resin (B) and the copolymer resin (C) being 100 parts by weight;

(a) a polymeric binder component comprising a styrene-acrylonitrile copolymer comprising 50 to 95% by weight of a styrene monomer and 5 to 50% by weight of an acrylonitrile monomer and a copolymer comprising 5 to 50% by weight of an unsaturated dicarboxylic acid anhydride or an unsaturated carboxylic acid and 50 to 95% by weight of an unsaturated monomer;

(b) a polymeric binder comprising a polyurethane containing an aromatic diisocyanate as its constituent;

(c) a silane binder component comprising at least one of $\gamma$-aminopropyltriethoxysilane, N-$\beta$-(aminoethyl)-$\gamma$- aminopropyltriethoxysilane, and N-β-(aminoethyl)-N'-β'-(aminoethyl)-γ-aminopropyltriethoxysilane.

The glass fiber suitable for thermoplastic resin reinforcement according to another aspect of the present invention is a glass fiber obtained by use of a mixture of a polymeric binder component (a) or (b) and a silane binder component (c) shown below as the binder:

(a) a polymeric binder component comprising a styrene-acrylonitrile copolymer comprising 50 to 95% by weight of a styrene monomer and 5 to 50% by weight of an acrylonitrile monomer and a copolymer comprising 5 to 50% by weight of an unsaturated dicarboxylic acid anhydride or an unsaturated carboxylic acid and 50 to 95% by weight of an unsaturated monomer;

(b) a polymeric binder comprising a polyurethane containing an aromatic diisocyanate as its constituent;

(c) a silane binder component comprising at least one of γ-aminopropyltriethoxysilane, N-β-(aminoethyl)-γ-aminopropyltriethoxysilane, and N-β-(aminoethyl)-N'-β'-(aminoethyl)-γ-aminopropyltriethoxysilane.

The present invention is as described above, exhibits especially remarkable effects as described below, and its utilization value in industry is extremely great.

(1) The glass fiber reinforced thermoplastic resin composition exhibits high rigidity because of containing the glass fiber as specified above, while maintaining excellent impact resistance of the resin composition comprising a polyamide resin and an aromatic vinyl copolymer resin.

(2) The glass fiber reinforced thermoplastic resin according to the present invention, although containing glass fiber, will not impair excellent heat resistance, low hygroscopicity, excellent chemical resistance, excellent formability or moldability, excellent appearance, and the like possessed by the resin composition comprising a polyamide resin and an aromatic vinyl copolymer resin.

DETAILED DESCRIPTION OF THE INVENTION

Thermoplastic Resin Mixture (I)

The glass fiber reinforced thermoplastic resin composition according to the present invention contains as its resin constituent a thermoplastic resin mixture comprising a polyamide resin (I-1) and an aromatic vinyl copolymer resin (I-2). Here, "comprising" means that a small amount of compatible resin components other than the mentioned components (namely, polyamide resin and aromatic vinyl copolymer resin) can be also contained.

<Components>

(I-1) Polyamide resin

The polyamide resin which constitutes the resin composition according to the present invention is inclusive of all known nylon thermoplastic resins which can be injection molded. Specific examples of polyamide resins may include nylons called under general names such as nylon 6, nylon 66, copolymer nylon (e.g. copolymer of ε-caprolactam with adipic acid-hexamethylenediamine salt), nylon 610, nylon 612, nylon 11, nylon 12 and nylon MXD6, i.e. a polycondensate of m-xylylenediamine and adipic acid, or copolymers composed mainly of these and mixtures of these.

Among these examples, nylon 6, nylon 66 or copolymer nylon (e.g. one as exemplified above, and, in particular, a copolymer nylon of ε-caprolactam with hexamethylenediammonium adipate) are particularly preferable.

(I-2) Aromatic vinyl copolymer resin

The aromatic vinyl copolymer resin (I-2) comprises the copolymer resins of (A)–(C) shown below. The copolymer resin (C) is an optional component of which content can be zero. The fact that the aromatic vinyl copolymer resin "comprises" the mentioned components indicates that other resin components suited for the purpose than these mentioned components can be also contained in small amounts. Also, the term "comprise" is herein defined as inclusive of the case when the preparation step of another component is practiced in the presence of a certain component to attain the state comprising the component "in situ" (see the description shown below for the component (C)).

(A) Rubber reinforced styrene graft copolymer resin

The rubber-reinforced styrene graft copolymer resin as the component (A) in the present invention is typically a graft copolymer resin obtained by grafting an monomer mixture comprising 60% by weight or more of an aromatic vinyl monomer component as the main component onto a rubbery polymer having a glass transition temperature of 0° C. or lower, preferably a butadiene-based rubbery polymer.

Specific examples of the rubber reinforced styrene graft copolymer resin (A) may include acrylonitrile-butadiene-styrene copolymer (ABS resin), methyl methacrylate-butadiene-styrene copolymer (MBS resin), methyl methacrylate-acrylonitrile-butadiene-styrene copolymer (MABS resin), acrylonitrile-acrylic rubber-styrene copolymer (AAS resin), acrylonitrile-EPDM-styrene copolymer (AES resin), acrylonitrile-chlorinated polystyrene-styrene copolymer (ACS resin) or mixtures of these The rubber-reinforced styrene graft copolymer resin (A) has excellent impact resistance and has the effect as an impact modifier when it is formulated with other resin materials.

For the rubber reinforced styrene graft copolymer resin (A) to function effectively as an impact modifier in the resin composition according to the present invention, it is preferable to choose the average particle size of the rubber in said graft copolymer within the range of from 0.05 to 4 μm, and choose the graft gel content therein within the range of from 10 to 90% by weight based on said graft copolymer resin (A) as a whole. Outside of the ranges, the effect of improvement of physical properties such as impact resistance, etc. of the resin composition according to the present invention tends significantly to be lowered.

The average particle size of the rubber in the graft copolymer in the present invention refers to a weight average particle size measured on a dispersion in which a starting rubber latex (before graft polymerization) has been dispersed at 23° C. in water by means of "Coulter ®Nano-Sizer ™" manufactured by Coulter Electronics Ltd.) U.S.A., for the range of from 0.05 to 0.5 μm, while for the particle size in the range of from about 0.5 to 4 μm, it is a weight average particle size measured at 23° C. on a solution of a small amount of the graft copolymer dissolved in dimethylformamide with potassium thiocyanate added by means of "Coulter Counter Model TA II" manufactured also by Coulter Electronics Ltd., U.S.A.

The graft gel content in the present invention refers to a ratio of dried weight of the insolubles, obtained by dispersing and dissolving the above graft copolymer resin (A) in acetone of 23° C. followed by separation by centrifugation into insolubles and solubles, relative to the whole dried weight of the graft copolymer resin (A).

The rubber reinforced styrene graft copolymer resin (A) can be prepared by graft copolymerization according to a known method of a monomer mixture composed mainly of an aromatic vinyl monomer component in the presence of a rubber by way of emulsion polymerization, suspension polymerization, mass polymerization, solution polymerization known in the art.

(B) Aromatic vinyl-unsaturated carboxylic acid copolymer

The copolymer resin (B) constituting the resin composition of the present invention refers to one comprising (1) 30 to 80% by weight of an aromatic vinyl monomer component, (2) 0.1 to 30% by weight of (i) an unsaturated dicarboxylic acid anhydride, (ii) an unsaturated carboxylic acid, (iii) an unsaturated carboxylic acid metal salt, (iv) an unsaturated carboxylic acid ester or (v) an unsaturated carboxylic acid amide, (3) 0 to 65% by weight of a maleimide monomer component and (4) 0 to 40% by weight of another vinyl monomer component copolymerizable therewith, the total of said monomer components being 100% by weight. Also, in the case of this copolymer, the term "comprising" the mentioned components indicates that resin components suited for the purpose can be also contained in small amounts.

The copolymer resin (B) may be regarded as one improving the properties such as impact resistance and mechanical strength by its addition to a blend of a polyamide resin and the rubber-reinforced styrene graft copolymer resin (A), thereby improving dispersibility and miscibility of the components of the blend.

(B-1) Aromatic vinyl monomer

Specific examples of the aromatic vinyl monomer component which is the constituent of the copolymer resin (B) may include styrene, side chain- and/or nucleus-substituted styrene where the substituent may be a lower alkyl, a lower alkoxy, trifluoromethyl, a halogen and the like, for example, $\alpha$-alkylstyrenes such as $\alpha$-methylstyrene, nucleus-substituted alkylstyrenes such as p-methylstyrene, and vinylnaphthalene. Styrene and substituted styrenes substituted by a lower alkyl at its side chain and/or nucleus are preferable. These may be employed either singly or as a mixture of two or more.

The proportion of the aromatic vinyl monomer component in the copolymer resin (B) may be within the range of from 30 to 80% by weight. Outside of this range, the properties of heat resistance of the copolymer resin (B) or compatibility with the resin components are varied, whereby no resin composition with excellent physical properties would be prepared. A preferable range may be from 50 to 80% by weight.

(B-2) Unsaturated carboxylic acid monomer

Specific examples of unsaturated dicarboxylic acid anhydrides, unsaturated carboxylic acids, metal salts of unsaturated carboxylic acids, unsaturated carboxylic acid esters and unsaturated carboxylic acids may include (i) anhydrides of unsaturated dicarboxylic acids such as maleic anhydride and the like, (ii) unsaturated carboxylic acids which are carboxylic acid-containing vinyl monomers such as acrylic acid, methacrylic acid, itaconic acid, fumaric acid and the like, (iii) metal salts of unsaturated carboxylic acids such as alkali metal or alkaline earth metal salts of these unsaturated carboxylic acids, (iv) unsaturated carboxylic acid esters which are carboxylic acid ester-containing vinyl monomers such as $C_1$ to $C_{10}$ alkyl, cycloalkyl, benzyl, or phenyl acrylate, methacrylate, itaconate, fumarate, maleate and the like, and (v) unsaturated carboxylic acid amides such as acrylamide, methacrylamide, and so on. For the monomers (ii) to (v), acrylic and methacrylic acids are preferable as a carboxylic acid or as the derivatives as recited in the groups (iii) to (v). These may be used singly or as a mixture of two or more among each group and/or between the groups. Among them, maleic anhydride is particularly preferable with respect to compatibility of the copolymer resin (B).

The proportion of the vinyl monomer component such as unsaturated dicarboxylic acid anhydride, unsaturated carboxylic acids, metal salts of unsaturated carboxylic acids, unsaturated carboxylic acid esters, unsaturated carboxylic acid amides as exemplified above in the copolymer resin (B) may be within the range of from 0.1 to 30% by weight. Outside of this range, compatibility of the copolymer resin (B) with other resin components is varied, whereby no resin composition with excellent physical properties would be prepared. A preferable range may be from 0.5 to 20% by weight.

(B-3) Maleimide monomer

Representative as the maleimide monomer component (3) are maleimide, and N-substituted maleimides wherein the N-substituent is an aromatic hydrocarbyl group, such as phenyl or naphthyl, lower alkyl-substituted phenyl or naphthyl, or a linear or cyclic alkyl group. Specific examples may include maleimide; N-arylmaleimides such as N-phenylmaleimide, and N-methylphenylmaleimides such as N-(o-methylphenyl)-maleimide, N-(m-methylphenyl)maleimide, and N-(p-methylphenyl)maleimide; and N-naphthylmaleimide and the like, N-alicyclicalkylmaleimides having a cycloalkyl group of about 6 to 10 carbon atoms such as N-cyclohexylmaleimide and the like; and N-alkylmaleimides having an alkyl group of 1 to 10 carbon atoms. These may be used singly or as a mixture of two or more within each group and/or between the groups. Among them, a combination of N-phenylmaleimide with maleimide is particularly preferable in view of heat resistance, etc. of the resultant copolymer resin (B). The proportion of the maleimide monomer component in the copolymer resin (B) may be within the range of from 0 to 65% by weight. Outside of this range, the resin composition obtained will entail undesirably lowered heat resistance of the resin composition obtained and compatibility among the resin component used.

In view of the above, it should be understood that the wording "a maleimide monomer" includes N-substituted maleimides.

(B-4) Optional monomer

Specific examples of other vinyl monomers (4) copolymerizable with the above monomers which are optical may be generally those other than those mentioned above for the copolymer (B), but may include vinyl cyanide monomer components such as acrylonitrile and methacrylonitrile as representative examples.

The proportion of the vinyl monomer (4), particularly a vinyl cyanide monomer component, in the copolymer resin (B) may be within the range of from 0 to 40% by weight. If it exceeds 40% by weight, the physical properties of the resin obtained would be lowered to give no desired resin composition.

(B-5) Preparation of copolymer resin (B)

The above-described copolymer resin (B) can be prepared according to any desired method suited for the purpose. Representative of such methods are the two methods as shown below, and either one of them may be employed.

(1) A method in which the constituents of the copolymer resin (B) as such are used as the polymerization starting materials. More particularly, pertinent monomers comprising 30 to 80% by weight of an aromatic vinyl monomer, 0.1 to 30% by weight of a vinyl monomer component which is an unsaturated dicarboxylic anhydride, an unsaturated carboxylic acid, a metal salt of an unsaturated carboxylic acid, an unsaturated carboxylic acid ester or an unsaturated carboxylic acid amide, 0 to 65% by weight of a maleimide monomer and 0 to 40% by weight of another vinyl monomer copolymerizable therewith, and all or a part of the mixture, are subjected to polymerization conditions, as a single monomeric species or as a mixture of at least two monomeric species, at one time or in divided portions, to carry out copolymerization to prepare the copolymer resin (C) with a desired composition.

(2) A method in which the above-described method is practised for the precursor of a certain monomer, and the precursor is converted at a desired stage to a desired or final form of the monomer. For example, all or most of the N-substituted maleimide monomer component as the constituents of the copolymer resin (B) is replaced by its precursor, namely a corresponding maleic anhydride, and the monomer mixture comprising this precursor monomer component is copolymerized. Subsequently, the copolymer obtained is subjected to the imidization wherein it is reacted with one or a mixture of two or more of ammonia, an aliphatic primary amine such as a monoalkylamine or a monochloroalkylamine having 1 to 10 carbon atoms, an aromatic primary amine such as aniline or toluidine to prepare a copolymer resin (C) with a desired composition (see, for example, Japanese Laid-open Patent Publication No. 131213/1982).

According to either the method (1) or (2) as described above, specific operations may be by mass polymerization, solution polymerization, suspension polymerization and/or emulsion polymerization, and either batchwise or continuous operation may be employed. The above polymerization methods and the systems can be conveniently combined. The process product of the copolymerization operations may be followed by various unit operations such as known extraction, precipitation, distillation, agglomeration, filtration, washing, drying and pelletizing, etc. in a suitable combination. The copolymer resin to be used as the component (B) may be either one of the products obtained by the preparation method (1) or (2) or a mixture of the products of the methods (1) and (2).

(C) AS/M resin

The copolymer resin (C) constituting the composition of the present invention is a thermoplastic resin comprising 60 to 90% by weight of an aromatic vinyl monomer component, 0 to 40% by weight of a vinyl cyanide monomer component and 0 to 40% by weight of methyl methacrylate component, the total of said monomer components being 100% by weight.

The aromatic vinyl monomer and the vinyl cyanide monomer which are constituents of the above copolymer resin (C) have the same meanings as the respective vinyl monomers among those exemplified as the components of the above copolymer resin (B), and the monomers which may be the same as or different from those used in the copolymer resin (B) can be employed. The proportions of the components constituting the copolymer resin (C) are as specified above, and outside of this range, the characteristics of the resultant copolymer are varied, whereby compatibility with the resin components to be mixed tends to be poor and heat resistance or impact resistance of the desired resin composition will be undesirably lowered.

The polymerization method and polymerization conditions of the copolymer resin (C) can be conveniently selected from the batch system or continuous system of such method as emulsion polymerization, suspension polymerization, solution polymerization and mass polymerization, similarly as in the known preparation technique of acrylonitrile-styrene copolymer (AS resin).

The copolymer resin (C) can be prepared at the same time in the same polymerization system in the polymerization operations of the rubber reinforced styrene graft copolymer resin (A) and/or the copolymer resin (B), or can be also prepared under separately set polymerization method and the polymerization conditions.

<Composition and preparation of resin mixture>

The resin constituents which are the base materials of the composition of the present invention are obtained in the form of a resin mixture by weighing and mixing 20 to 80% by weight of the polyamide resin (I-1) as described above and 20 to 80% by weight of the aromatic vinyl copolymer resin (I-2) containing the rubber reinforced styrene graft copolymer resin (A), the copolymer resin (B) and the copolymer resin (C) respectively within the ranges of from 60 to 99.99 parts by weight (preferably from 70 to 90 parts by weight), from 0.01 to 40 parts by weight (preferably from 1 to 30 parts by weight) and from 0 to 15 parts by weight (preferably from 0 to 10 parts by weight). The mixing in that case may be a dry blending as such, but more preferably the dry blend should be subjected further to the melting and kneading step to effect melting mixing. If the amounts of the resins formulated are outside of the above ranges, no desired heat resistance and impact resistance of the resin composition would be obtained, and also no resin composition with good processability would be obtained. Here, "% by weight" and "parts by weight" are respectively values when the total of the mentioned components is made respectively 100% and 100 parts by weight.

For formulation, mixing kneading of the respective constituents of the resin composition of the present invention, known mixing and kneading methods may be employed.

For example, one or a mixture of the resins in the form of powder, beads, flakes or pellets can be formed into a resin composition by an extruder such as monoaxial extruder, biaxial extruder, etc. or a kneading machine such as Banbury mixer, compression kneader, twin rolls, etc. Also, in some cases, it is also possible to employ the method in which one or two or more of these resins after completion of polymerization may be mixed under undried state, precipitated, washed and dried.

The order of such mixing and kneading may be such that the three or four kinds of the resin components are mixed and kneaded at the same time, or that first one or two or more kinds of the component resins are mixed and kneaded, and another batch of a kneaded product of one or two or more of the resin components separately kneaded are combined and further kneaded, to give a desired resin composition.

If volatiles remain in the resin composition, physical properties such as heat resistance may be lowered in some cases, and therefore in carrying out mixing and kneading by use of an extruder, it is preferable to perform the kneading operation under forced volatilization conditions. The resin composition thus obtained may be used as such or after drying for molding processing, etc.

Glass Fiber (II)

<Glass fiber in general>

The glass fiber to be contained in the resin composition is glass fiber prepared by use of a specific binder or sizing agent. In other words, the glass fiber to be formulated in the resin composition in the present invention is not essentially different from those available for resin formulation except for employing a specific binder material in its preparation steps.

Accordingly, the glass fiber to be used in the composition of the present invention is ordinarily the so called chopped strand glass fiber, which is generally obtained by spinning melted E glass into glass filaments, subjecting the filament to spraying or coating with a binder, then binding and drying the glass filaments, which will then be chopped or cut. The glass fiber will, when it is formulated together with the resin components into the resin composition of the present invention, introduce improved physical properties such as rigidity, heat resistance and dimensional stability in the flormed or molded product of the resin composition, as described above.

<Binder>

The binder which characterizes the glass fiber to be used in the present invention comprises a mixture of a polymeric binder component and a silane binder component.

Here, the polymeric binder component is represented by (a) or (b) shown below, and the silane binder component by (c) shown below.

(a) Polymeric binder component

The polymeric binder component (a) is a mixture of a styrene-acrylonitrile copolymer (a-1) comprising 50 to 95% by weight of a styrene monomer and 5 to 50% by weight of an acrylonitrile monomer and a copolymer (a-2) comprising 5 to 50% by weight of an unsaturated dicarboxylic acid anhydride and 50 to 90% by weight of an unsaturated monomer. Here, "comprising", particularly for (a-1), means that a small amount of an ethylenically unsaturated monomer other than the mentioned components may be also copolymerized. The composition (% by weight) in that case is based on the total of the mentioned components as 100. The mixing ratio of (a-1) and (a-2) is as specified below.

The binder component (a-1) has a proportion within the range of 50 to 95% by weight of a styrene monomer component and 5 to 50% by weight of an acrylonitrile monomer component as shown hereinbefore, and outside of this range, compatibility of the glass fiber with the resin composition (A) to (C), etc. will be lowered, whereby no resin composition having excellent physical properties would be prepared.

Specific examples of the unsaturated dicarboxylic acid anhydride in the above binder component (a-2) may include maleic acid, and specific examples of unsaturated carboxylic acids may include acrylic acid, methacrylic acid, vinylacetic acid, crotonic acid, isocrotohic acid, fumaric acid, itaconic acid, citraconic acid, and mesaconic acid. Particularly preferred are maleic anhydride, acrylic acid, and methacrylic acid. Specific examples of the unsaturated monomers for the copolymer (a-2) include $\alpha$-methylstyrene, butadiene, isoprene, ethylene, 1,3-pentadiene, methyl acrylate, ethyl acrylate, butyl acrylate, methyl methacrylate, ethyl methacrylate, butyl methacrylate. Particularly preferred are styrene and methyl acrylate. The composition is 5 to 50% by weight of the unsaturated dicarboxylic acid or unsaturated carboxylic acid, and 50 to 95% by weight of the unsaturated monomer as defined above, and outside of this range, compatibility of the glass fiber with the resin composition (A) to (C), etc. will be lowered, whereby no resin composition having excellent physical properties can be prepared.

(b) Polymeric binder (bis)

Another polymeric binder component (b) is a polyurethane containing an aromatic diisocyanate as its constituent. If other isocyanate components than aromatic isocyanates are employed, compatibility of the glass fiber with the resin composition (A) to (C), etc. will be lowered, whereby no resin composition having excellent physical properties would be prepared.

Specific examples of the aromatic diisocyanate include phenylene diisocyanate (e.g. meta-), tolylene diisocyanate (e.g. 100%, 2,4-isomer, 65% 2,4-isomer +35% 2,6-isomer, 80%, 2,4-isomer+20% 2,6-isomer, and others), xylylene diisocyanate (e.g. p-xylylene-2,5-diisocyanate), 3,3'-bitolylene-4,4'-diisocyanate, diphenylmethane-4,4'-diisocyanate, naphthalene-1,5-diisocyanate, 2,4-tolylene diisocyanate dimer, and others. These diisocyanates can be also used in combination with small amounts of triisocyanates such as triphenylmethane triisocyanate.

On the other hand, the polyol component which should undergo polyaddition reaction with these diisocyanates may be appropriately a polyester or a polyether having hydroxyl groups at both ends thereof.

Specific examples of the polyester component which is the polyol in the polyurethane may include those comprising ethylene glycol, propylene glycol, 1,4-butanediol, or 1,6-hexane diol as the diol component, and adipic acid, sebacic acid, etc. as the main dicarboxylic acid component.

Specific examples of the polyether component which is the polyol in the polyurethane may include polyethylene glycol, polypropylene glycol and 1,4-polybutane diol.

Specific examples of the chain extender which is the polyol in the polyurethane may include diols such as ethylene glycol, propylene glycol, tetramethylene glycol and the like, and diamines such as ethylenediamine, hexamethylenediamine and the like.

The polyurethanes comprising these components have been well known in the art, including the preparation methods thereof.

(c) Silane binder component

The silane compound (c) to be used as a mixture with the above polymeric binder component is specifically γ-aminopropyltriethoxysilane, N-β-(aminoethyl)-γ-aminopropyltriethoxysilane, or N-β-(aminoethyl)-N'-β'-(aminoethyl)-γ-aminopropyltriethoxysilane. These silane compounds may be used either singly or a combination of two or more compounds can be also used.

The binder in the present invention is a mixture of the above-described (a) or (b) and (c), and these may be formulated at proportions of (a-1):(a-2):(c)=(23 to 76):(23 to 76):(1 to 30) or (b):(c)=(99 to 70):(1 to 30, these proportions being based on 100 parts by weight of the total of the mentioned components. The glass fiber obtained from a mixture outside of this proportions has its poor advantageous contribution to the resin composition to which it is formulated.

The mixtures of the binder components are generally used as solutions or dispersions, but preferably used as an aqueous emulsion.

The content of the binder in the glass fiber should be preferably within the range of from 0.2 to 3.0% by weight. Outside of this range, handling workability, dispersibility into the resin composition of the glass fiber, and improvement of physical properties are worsened.

Composition of the Invention

The glass fiber should be preferably formulated at a proportion within the range of from 5 to 100 parts by weight, preferably from 10 to 50 parts by weight, based on 100 parts by weight of the thermoplastic resin composition comprising a polyamide resin and an aromatic vinyl copolymer resin. Outside of this range, no glass fiber reinforced thermoplastic resin composition having both excellent rigidity and impact resistance aimed at would be obtained. Formulation of the glass fiber into the above thermoplastic resin composition may be done in such a way that the glass fiber is added to the resin components when they are kneaded, or alternatively in such a way that the glass fiber is formulated into the pellets of the thermoplastic resin composition which are to be kneaded.

Into the glass fiber reinforced thermoplastic resin composition according to the present invention, various resin additives such as lubricants, mold release agents, colorants, antistatic agents, flame retardants, UV-ray absorbers, stabilizers against light, stabilizers against heat, nucleation agents and others can be added in a suitable combination of the kinds and in amounts which do not interfere with the properties of the resin.

The glass fiber-reinforced resin composition according to the present invention can be formed or molded into products such as automobile parts, electrical parts, industrial parts, articles for sports by various processing methods such as injection molding, extrusion molding, compression molding, etc., and can be used for uses for which excellent heat resistance and excellent low temperature impact resistance are desired.

EXPERIMENTAL EXAMPLES

The following Examples and Comparative examples are set forth for describing in detail the present invention. The present invention is not limited to the following Examples, provided that it does not exceed the spirit thereof.

In the following examples, "parts" represent "parts by weight".

PREPARATION EXAMPLE (II)

(1) Preparation of rubber reinforced styrene graft copolymer resin (A)-I:

A monomer mixture (I) comprising 70 parts of styrene (hereinafter abbreviated as St) and 30 parts of acrylonitrile (hereinafter abbreviated as AN) was prepared.

Into a glass flask equipped with a stirrer, a reflux condenser, a thermometer and an inlet device were charged 270 parts of an aqueous styrene-butadiene rubber latex (St content 10% by weight, rubber solid concentration 37% by weight, rubber average particle size 0.30 μm) and 100 parts by weight of deionized water, and the inner temperature of the mixture was raised to 70° C. with stirring under nitrogen gas stream. A solution of 0.01 part of ferrous sulfate, 0.25 part of dextrose and 1 part of sodium pyrrophosphate dissolved in a small amount of water was added into the polymerization system.

Subsequently, additions to the flask of 25 parts of an aqueous dispersion of cumene hydroperoxide (hereinafter abbreviated as CHPO) (containing 0.5 part of CHPO) continuously over 180 minutes, and of the whole amount of the monomer mixture (I) continuously over 140 minutes were started, whereby the polymerization was initiated at the temperature of 70° C. After 120 minutes after initiation of the polymerization reaction, 0.2 part of sodium dodecylbenzenesulfonate was added into the polymerization system. Graft polymerization was continued to be carried out at the temperature for 210 minutes after initiation of the polymerization.

The latex obtained after completion of the graft polymerization reaction was added dropwise into an aqueous 4% magnesium sulfate solution heated to 95° C. to effect salting-out, followed by dehydration and drying, to give a powdery rubber-reinforced styrene graft copolymer resin (A)-I.

The rubber-reinforced styrene graft copolymer resin (A)-I had a specific viscosity of 0.065 and a degree of grafting of 68%.

(2) Preparation of a rubber reinforced styrene graft copolymer resin (A)-II:

(A)-II was obtained in the same manner as (A)-I except for addition of 1.1 part of t-dodecylmercaptan as a molecular weight controlling agent to the monomer mixture in the preparation example of (A)-I, and also for change of ferrous sulfate to 0.01 part and dextrose to 0.8 part.

The rubber-reinforced styrene graft copolymer resin (A)-II obtained had a specific viscosity of 0.035 and a degree of grafting of 40%.

(3) Preparation of a copolymer resin (B)-I:

Into a pressure-resistant polymerization vessel equipped with a condenser, a stirring device and an inlet device were charged 690 parts of St and 19 parts of maleic anhydride, and the polymerization vessel was purged with nitrogen gas. The polymerization vessel was heated with stirring to raise the temperature within the vessel to 95° C., whereby the polymerization was initiated in a mass. One hundred (100) parts of melted maleic anhydride heated to 70° C. were added continuously at a constant rate into the polymerization system of 95° C. over 460 minutes after initiation of the polymerization reaction. After 460 minutes after initiation of the polymerization, a viscous liquid with a rate of polymerization of 44% by weight was obtained.

The viscous liquid was poured into a large excess of methanol to remove unreacted monomer, followed by drying, to give a styrene-maleic anhydride copolymer. Into an autoclave equipped with a stirrer and an inlet device were charged 300 parts of the styrene-maleic anhydride copolymer obtained and 600 parts of xylene, and the reaction system was purged with nitrogen gas. The reaction system which became a homogeneous solution was heated to raise its temperature to 155° C., and 93 parts of aniline and 0.9 part of triethylamine were added into the autoclave to initiate the polymeric imidation reaction. The polymeric imidation reaction was continued at the temperature for 240 minutes after initiation of the reaction. The polymer solution obtained was poured into methanol to precipitate the polymer, which was washed, filtered and dried, to give a copolymer resin (B)-I.

The composition of the copolymer resin (B)-I obtained as the result of NMR analysis was found to be 57.6% of styrene component, 41.6% of N-phenylmaleimide component and 0.8% by weight of maleic anhydride component.

(4) Preparation of copolymer resin (B)-II and copolymer resin (C) mixture:

Into a pressure-resistant polymerization vessel equipped with a condenser, a stirrer, and n inlet device were charged 690 parts of St and 19 parts of maleic anhydride, and the polymerization vessel was purged with nitrogen gas. The polymerization vessel was heated stirring to raise the temperature within the vessel to 95° C., whereby the polymerization reaction was initiated in a mass. One hundred parts of melted maleic anhydride heated to 70° C. was added continuously at a constant rate over 460 minutes after initiation of the polymerization reaction into the polymerization system of 95° C. After 460 minutes after initiation of the polymerization, a viscous liquid with a rate of polymerization of 44% by weight was obtained.

Into the polymerization system were added 210 parts of AN continuously over 460 minutes to 480 minutes after initiation of the polymerization. The temperature of the polymerization system was lowered from 95° C. to 90° C., and the polymerization was continued in a mass for further 20 minutes. Maleic anhydride in the unreacted monomers substantially disappeared, and the whole amount was consumed in the polymerization reaction.

Into the polymerization system were added 700 parts of an aqueous solution of 0.03 part of a polyvinylalcohol-based stabilizer and 0.03 part of an acrylic acid-octyl acrylate copolymer-based suspension stabilizer dissolved therein and 2 parts of di-t-butylperoxide, to convert the mass polymerization system into the suspension polymerization system. The suspension polymerization system was heated to 110° C., and the unreacted monomers were removed by stripping at the temperature for 120 minutes. Then, 80 parts of AN were added, and the temperature of the suspension system was elevated from 110° C. to 150° C. over 60 minutes. While maintaining the temperature of the suspension system at 150° C., stripping was again effected for 120 minutes.

The suspension system after completion of stripping was heated to raise its temperature to 155° C., 90 parts of aniline and 10 parts of an aqueous 25% by weight ammonia solution were added to carry out the polymeric imidation reaction under stirring of the suspension system at the temperature for 120 minutes. The temperature of the suspension system was lowered, and filtration, washing with water and drying were conducted to give beads of a copolymer. The beads of a copolymer was processed into pellets by a monoaxial extruder.

As the result of analysis of the pellets, they were found to be a mixture of the copolymer resin (B)-II comprising 58.8% by weight of styrene component, 38.2% by weight of N-phenylmaleimide component, 1.4% by weight of maleimide component and 1.6% by weight of maleic anhydride component and the copolymer resin (C) comprising 73.8% by weight of styrene component and 26.6% by weight of acrylonitrile component, in the proportion of 76% by weight of the copolymer resin (B)-II and 24% by weight of the copolymer resin (C).

(5) Preparation of glass fibers (I)-I to X:

Glass filaments formed in the spinning step where glass was melted and withdrawn from spinnerettes were coated with a mixture of binders previously emulsified into water to bind them into strands, which glass fiber strands were taken up and dried, followed by chopping or cutting, to obtain a chopped glass fiber containing 0.8% by weight of the binder.

The type of binders used and the diameter and length of the glass fiber obtained are set forth in Table 1.

EXAMPLES (I) 1 TO 9, COMPARATIVE EXAMPLES (I) 1 TO 7

Nylon 6 (NOVAMID ® 1010, manufactured by Mitsubishi Kasei Kogyo K.K., Japan) as the polyamide resin, and the rubber reinforced styrene graft copolymer resin (A), the copolymer resin (B) and the copolymer resin (C) obtained by the method in the above preparation example (I) were weighed as the constituents in the formulation proportions (parts) shown in Table 2, and blended by a tumbler, and the resulting blend was kneaded by means of a vented biaxial extruder while removing volatiles to prepare pellets of the resin composition.

Into the resin composition comprising the polyamide resin and the aromatic vinyl copolymer resin obtained by the above-described method were blended the glass fibers weighed at the formulation ratios (parts by weight) shown in Table 2, and the blend obtained was kneaded by a vented monoaxial extruder while removing volatiles to obtain pellets of the glass fiber reinforced thermoplastic resin.

From the pellets of the glass fiber-reinforced thermoplastic resin composition, test strips for measurement of physical properties were prepared by injection molding. For the test strips, according to the methods shown in Table 2, under humid conditions (23° C., 50% RH saturated water absorption), tensile strength, flexural modulus, Izod impact strength (notched), FDI. load deflection temperature and melt flow rate were respectively measured. The results were as shown in Table 2.

TABLE 1

| Glass fiber (I) | I | II | III | IV | V | VI | VII | VIII | IX | X |
|---|---|---|---|---|---|---|---|---|---|---|
| Binder (a-1) | 75 | 75 | 75 | 75 | 25 | 75 | — | — | — | — |
| Styrene/acrylonitrile = 70/30 copolymer | | | | | | | | | | |
| Binder (a-2) | | | | | | | | | | |
| Styrene/maleic anhydride = 50/50 copolymer | 25 | 25 | 25 | 25 | 75 | — | — | — | — | — |
| Styrene/acrylic acid = 50/50 copolymer | — | — | — | — | — | 25 | — | — | — | — |
| Binder (c) | | | | | | | | | | |
| γ-aminopropyltriethoxysilane | 2 | 2 | 2 | — | 2 | 2 | 2 | 2 | 2 | 2 |
| N-β-(aminoethyl)-γ-aminopropyltriethoxysilane | — | — | — | 2 | — | — | — | — | — | — |
| Other binders | | | | | | | | | | |
| IPDI + Polyester PPG urethane | — | — | — | — | — | — | — | 100 | 100 | — |
| IPDI + Polyether PPG urethane | — | — | — | — | — | — | 100 | — | — | 100 |
| Fiber length (mm) | 3 | 6 | 3 | 3 | 3 | 3 | 3 | 3 | 3 | 6 |
| Fiber diameter (μ) | 13 | 13 | 10 | 13 | 13 | 13 | 13 | 13 | 10 | 13 |

TDI: Tolylene diisocyanate
IPDI: Isophorone diisocyanate
PPG: Polyoxypropylene glycol

TABLE 2

| | Examples (I) | | | | | | | | |
|---|---|---|---|---|---|---|---|---|---|
| | 1 | 2 | 3 | 4 | 5 | 6 | 7 | 8 | 9 |
| Polyamide resin | 50 | 50 | 50 | 50 | 50 | 50 | 50 | 50 | 50 |
| Rubber reinforced styrene | | | | | | | | | |
| Graft copolymer resin (A)-I | 40 | 40 | 40 | 40 | 40 | 40 | 40 | 40 | — |
| Graft copolymer resin (A)-II | — | — | — | — | — | — | — | — | 40 |
| Copolymer resin (B) | 7.5 | 7.5 | 7.5 | 7.5 | 7.5 | 7.5 | 7.5 | 7.5 | 7.5 |
| Copolymer resin (C) | 2.5 | 2.5 | 2.5 | 2.5 | 2.5 | 2.5 | 2.5 | 2.5 | 2.5 |
| Glass fiber (I)-I | 25 | 33 | 43 | — | — | — | — | — | 25 |
| Glass fiber (I)-II | — | — | — | 25 | — | — | — | — | — |
| Glass fiber (I)-III | — | — | — | — | 25 | — | — | — | — |
| Glass fiber (I)-IV | — | — | — | — | — | 25 | — | — | — |
| Glass fiber (I)-V | — | — | — | — | — | — | 25 | — | — |
| Glass fiber (I)-VI | — | — | — | — | — | — | — | 25 | — |
| Glass fiber (I)-VII | — | — | — | — | — | — | — | — | — |
| Glass fiber (I)-VIII | — | — | — | — | — | — | — | — | — |
| Glass fiber (I)-IX | — | — | — | — | — | — | — | — | — |
| Glass fiber (I)-X | — | — | — | — | — | — | — | — | — |
| Tensile strength[*1] (kg/cm$^2$) | 730 | 840 | 900 | 770 | 790 | 800 | 800 | 770 | 740 |
| Flexural modulus[*2] (× 10$^4$ kg/cm$^2$) | 4.5 | 5.4 | 6.0 | 4.7 | 4.6 | 4.6 | 4.7 | 4.6 | 4.5 |
| Izod impact strength[*3] (kg/cm/cm), notched | 12 | 12 | 13 | 12 | 11 | 12 | 11 | 11 | 19 |

| | Comparative Examples (I) | | | | | | |
|---|---|---|---|---|---|---|---|
| | 1 | 2 | 3 | 4 | 5 | 6 | 7 |
| Polyamide resin | 50 | 50 | 50 | 50 | 50 | 50 | 50 |
| Rubber reinforced styrene | | | | | | | |
| Graft copolymer resin (A)-I | 40 | 40 | 40 | 40 | 40 | 40 | — |
| Graft copolymer resin (A)-II | — | — | — | — | — | — | 40 |
| Copolymer resin (B) | 7.5 | 7.5 | 7.5 | 7.5 | 7.5 | 7.5 | 7.5 |
| Copolymer resin (C) | 2.5 | 2.5 | 2.5 | 2.5 | 2.5 | 2.5 | 2.5 |
| Glass fiber (I)-I | — | — | — | — | — | — | — |
| Glass fiber (I)-II | — | — | — | — | — | — | — |
| Glass fiber (I)-III | — | — | — | — | — | — | — |
| Glass fiber (I)-IV | — | — | — | — | — | — | — |
| Glass fiber (I)-V | — | — | — | — | — | — | — |
| Glass fiber (I)-VI | — | — | — | — | — | — | — |
| Glass fiber (I)-VII | 25 | 33 | 43 | — | — | — | 25 |
| Glass fiber (I)-VIII | — | — | — | 25 | — | — | — |
| Glass fiber (I)-IX | — | — | — | — | 25 | — | — |
| Glass fiber (I)-X | — | — | — | — | — | 25 | — |
| Tensile strength[*1] (kg/cm$^2$) | 730 | 830 | 890 | 750 | 860 | 750 | 740 |
| Flexural modulus[*2] (× 10$^4$ kg/cm$^2$) | 4.4 | 5.3 | 5.9 | 4.6 | 4.7 | 4.6 | 4.5 |
| Izod impact strength[*3] | 4 | 5 | 6 | 4 | 4 | 8 | 12 |

TABLE 2-continued (kg/cm/cm), notched (Note)
*1: measured according to JIS K7113
*2: measured according to JIS K7110 (notched)
*3: measured according to JIS K7207 Method A (without annealing)
*4: measured according to JIS K7210 Method B (load 10 kgf, temperature 260° C.)

From Table 2, the following will be understood.

(1) The glass fiber-reinforced thermoplastic resin composition according to the present invention exhibits high rigidity, while maintaining excellent impact resistance possessed by the non-reinforced resins (Example (I) 1 to 9). On the other hand, the systems in which the glass fibers treated with the binders according to the present invention are not used (Comparative examples (I) 1 to 7) may have high rigidity, but suffer from markedly lowered impact resistance.

Also, the resin compositions obtained outside the scope of the present invention have poor balance in these properties, i.e. having the drawback of poor balance between impact resistance and rigidity (Comparative examples (I) 1 to 7).

PREPARATION EXAMPLE (II)

(1) Preparation of the rubber-reinforced styrene graft copolymer resin (A)-I

The same as in Preparation example (I).

(2) Preparation of the rubber-reinforced styrene graft copolymer resin (A)-II

The same as in Preparation example (II).

(3) Preparation of the copolymer resin (B)-I

The same as in Preparation example (I).

(4) Preparation of the mixture of the copolymer resin (B)-II and the copolymer resin (C)

The same as in Preparation example (II).

(5) Preparation of glass fibers (II)-I to IX

Glass filaments formed in the spinning step where glass was melted and withdrawn from spinnerettes were coated with a mixture of binders previously emulsified into water to bind them into strands, which glass fiber strands were taken up and dried, followed by chopping or cutting to a predetermined length, to obtain chopped glass fiber containing 0.5% by weight of the binder.

The type of binders used and the diameter and length of the glass fiber obtained are set forth in Table 3.

EXAMPLES (II) 1 TO 8, COMPARATIVE EXAMPLES (II) 1 TO 7

Nylon 6 (NOVAMID® 1010, manufactured by Mitsubishi Kasei Kogyo K.K., Japan) as the polyamide resin, and the rubber reinforced styrene graft copolymer resin (A), the copolymer resin (B) and the copolymer resin (C) obtained by the method in the above preparation example (II) were weighed as the constituents in the formulation proportions (parts) shown in Table 4 and blended by a tumbler, and the resulting blend was kneaded by means of a vented biaxial extruder while removing volatiles to prepare pellets of the resin composition.

Into the resin composition comprising the polyamide resin and the aromatic vinyl copolymer resin obtained by the above-described method were blended the glass fibers weighed at the formulation ratios (parts by weight) shown in Table 4, and the blend obtained was kneaded by a vented monoaxial extruder while removing volatiles to obtain pellets of the glass fiber reinforced thermoplastic resin.

From the pellets of the glass fiber-reinforced thermoplastic resin composition, test strips for measurement of physical properties were prepared by injection molding. For the test strips, according to the methods shown in Table 1, under humid conditions (23° C., 50% RH saturated water absorption), tensile strength, flexural modulus, Izod impact strength (notched), FDI, load deflection temperature and melt flow rate were respectively measured. The results were as shown in Table 4.

TABLE 3

| Glass fiber (II) | I | II | III | IV | V | VI | VII | VIII | IX |
|---|---|---|---|---|---|---|---|---|---|
| Binder (b) | | | | | | | | | |
| TDI + Polyester PPG urethane | 100 | 100 | 100 | 100 | — | — | — | — | — |
| TDI + Polyether PPG urethane | — | — | — | — | 100 | — | — | — | — |
| Other Binders | | | | | | | | | |
| IPDI + Polyester PPG urethane | — | — | — | — | — | — | 100 | 100 | — |
| IPDI + Polyether PPG urethane | — | — | — | — | — | 100 | — | — | 100 |
| Binder (c) | | | | | | | | | |
| γ-aminopropyltriethoxysilane | 2 | 2 | 2 | — | 2 | 2 | 2 | 2 | 2 |
| N-β-(aminoethyl)-γ-aminopropyltriethoxysilane | — | — | — | 2 | — | — | — | — | — |
| Fiber length (mm) | 3 | 6 | 3 | 3 | 3 | 3 | 3 | 3 | 6 |
| Fiber diameter (μ) | 13 | 13 | 10 | 13 | 13 | 13 | 13 | 10 | 13 |

TABLE 4

| | Examples (II) | | | | | | | |
|---|---|---|---|---|---|---|---|---|
| | 1 | 2 | 3 | 4 | 5 | 6 | 7 | 8 |
| Polyamide resin | 50 | 50 | 50 | 50 | 50 | 50 | 50 | 50 |
| Rubber-reinforced styrene | | | | | | | | |
| Graft copolymer resin (A)-I | 40 | 40 | 40 | 40 | 40 | 40 | 40 | — |
| Graft copolymer resin (A)-II | — | — | — | — | — | — | — | 40 |
| Copolymer resin (B) | 7.5 | 7.5 | 7.5 | 7.5 | 7.5 | 7.5 | 7.5 | 7.5 |
| Copolymer resin (C) | 2.5 | 2.5 | 2.5 | 2.5 | 2.5 | 2.5 | 2.5 | 2.5 |
| Glass fiber (II)-I | 25 | 33 | 43 | — | — | — | — | 25 |

TABLE 4-continued

|  |  |  |  |  |  |  |  |  |
| --- | --- | --- | --- | --- | --- | --- | --- | --- |
| Glass fiber (II)-II | — | — | — | 25 | — | — | — | — |
| Glass fiber (II)-III | — | — | — | — | 25 | — | — | — |
| Glass fiber (II)-IV | — | — | — | — | — | 25 | — | — |
| Glass fiber (II)-V | — | — | — | — | — | — | 25 | — |
| Glass fiber (II)-VI | — | — | — | — | — | — | — | — |
| Glass fiber (II)-VII | — | — | — | — | — | — | — | — |
| Glass fiber (II)-VIII | — | — | — | — | — | — | — | — |
| Glass fiber (II)-IX | — | — | — | — | — | — | — | — |
| Tensile strength*1 (kg/cm$^2$) | 770 | 860 | 920 | 790 | 830 | 740 | 800 | 750 |
| Flexural modulus*2 (× 10$^4$ kg/cm$^2$) | 4.7 | 5.5 | 6.1 | 4.9 | 4.8 | 4.6 | 4.8 | 4.5 |
| Izod impact strength*3 (kg/cm/cm), notched | 12 | 12 | 13 | 12 | 11 | 11 | 12 | 18 |

|  | Comparative Examples (II) | | | | | | |
| --- | --- | --- | --- | --- | --- | --- | --- |
|  | 1 | 2 | 3 | 4 | 5 | 6 | 7 |
| Polyamide resin | 50 | 50 | 50 | 50 | 50 | 50 | 50 |
| Rubber-reinforced styrene | | | | | | | |
| Graft copolymer resin (A)-I | 40 | 40 | 40 | 40 | 40 | 40 | — |
| Graft copolymer resin (A)-II | — | — | — | — | — | — | 40 |
| Copolymer resin (B) | 7.5 | 7.5 | 7.5 | 7.5 | 7.5 | 7.5 | 7.5 |
| Copolymer resin (C) | 2.5 | 2.5 | 2.5 | 2.5 | 2.5 | 2.5 | 2.5 |
| Glass fiber (II)-I | — | — | — | — | — | — | — |
| Glass fiber (II)-II | — | — | — | — | — | — | — |
| Glass fiber (II)-III | — | — | — | — | — | — | — |
| Glass fiber (II)-IV | — | — | — | — | — | — | — |
| Glass fiber (II)-V | — | — | — | — | — | — | — |
| Glass fiber (II)-VI | 25 | 33 | 43 | — | — | — | 25 |
| Glass fiber (II)-VII | — | — | — | 25 | — | — | — |
| Glass fiber (II)-VIII | — | — | — | — | 25 | — | — |
| Glass fiber (II)-IX | — | — | — | — | — | 25 | — |
| Tensile strength*1 (kg/cm$^2$) | 730 | 830 | 890 | 750 | 860 | 750 | 740 |
| Flexural modulus*2 (× 10$^4$ kg/cm$^2$) | 4.4 | 5.3 | 5.9 | 4.6 | 4.7 | 4.6 | 4.5 |
| Izod impact strength*3 (kg/cm/cm), notched | 4 | 5 | 6 | 4 | 4 | 8 | 12 |

(Note)
*1: measured according to JIS K7113
*2: measured according to JIS K7110 (notched)
*3: measured according to JIS K7207 Method A (without annealing)
*4: measured according to JIS K7210 Method B (load 10 kgf, temperature 260° C.)

From Table 4, the following will be understood.

(1) The glass fiber-reinforced thermoplastic resin composition according to the present invention exhibits high rigidity, while maintaining excellent impact resistance possessed by the non-reinforced resins (Example (II) 1 to 9). On the other hand, the systems in which the glass fibers treated with the binders according to the present invention are not used (Comparative examples (II) 1 to 7) may have high rigidity, but suffer from markedly lowered impact resistance.

Also, the resin compositions obtained outside the scope of the present invention have poor balance in these properties, i.e. having the drawback of poor balance between impact resistance and rigidity (Comparative examples (II) 1 to 7).

What is claimed is:

1. A glass fiber-reinforced thermoplastic resin comprising 100 parts by weight of a thermoplastic resin mixture (I) comprising 20 to 80% by weight of a polyamide resin (I-1) and 20 to 80% by weight of an aromatic vinyl copolymer resin (I-2) comprising copolymer resins (A) to (C) shown below, the total of the polyamide resin and the aromatic vinyl copolymer resin being 100% by weight, and 5 to 100 parts by weight of glass fiber (II) having a coat thereon of a binder which is a mixture of a polymeric binder component (a) or (b) and a silane binder component (c) shown below:

(A) 60 to 99.99 parts by weight of a rubber-reinforced styrene graft copolymer;

(B) 0.01 to 40 parts by weight of a copolymer resin comprising (1) 30 to 80% by weight of an aromatic vinyl monomer component, (2) 0.1 to 30% by weight of (i) an unsaturated dicarboxylic acid anhydride, (ii) an unsaturated carboxylic acid, (iii) an unsaturated carboxylic acid metal salt, (iv) an unsaturated carboxylic acid ester or (v) an unsaturated carboxylic acid amide, (3) 0 to 65% by weight of a maleimide monomer component and (4) 0 to 40% by weight of another vinyl monomer component copolymerizable therewith, the total of said monomer components being 100% by weight;

(C) 0 to 15 parts by weight of a copolymer resin comprising 60 to 90% by weight of an aromatic vinyl monomer component, 0 to 40% by weight of a vinyl cyanide monomer component and 0 to 40% by weight of methyl methacrylate component, the total of said monomer components being 100% by weight;

provided that the total of the rubber-reinforced styrene graft copolymer resin (A), the copolymer resin (B) and the copolymer resin (C) being 100 parts by weight;

(a) a polymeric binder component comprising a styrene-acrylonitrile copolymer comprising 50 to 95% by weight of a styrene monomer and 5 to 50% by weight of an acrylonitrile monomer and a copolymer comprising 5 to 50% by weight of an unsaturated dicarboxylic acid anhydride or an unsaturated carboxylic acid and 50 to 95% by weight of an unsaturated monomer;

(b) a polymeric binder comprising a polyurethane containing an aromatic diisocyanate as its constituent;

(c) a silane binder component comprising one or a combination of two or more of γ-aminopropyltriethoxysilane, N-β-(aminoethyl)-γ-aminopropyltriethoxysilane, and N-β-(aminoethyl)-N'-β'-(aminoethyl)-γ-aminopropyltriethoxysilane.

2. A glass fiber-reinforced thermoplastic resin as claimed in claim 1, wherein the polyamide resin (I-1) is selected from the group consisting of nylon 6, nylon 66, a copolymer nylon of ε-caprolactam with hexamethylene diammonium adipate, nylon 610, nylon 612, nylon 11, nylon 12 and nylon MXD6.

3. The glass fiber-reinforced thermoplastic resin as claimed in claim 2, wherein the polyamide resin (I-1) is nylon 6, nylon 66 or a copolymer nylon of ε-caprolactam with hexamethylene diammonium adipate.

4. The glass fiber-reinforced thermoplastic resin as claimed in claim 1, wherein the rubber-reinforced styrene graft copolymer resin (A) is a product of graft copolymerization of a monomer comprising at least 60% by weight of the monomer of an aromatic vinyl monomer component into a rubbery polymer having a glass transition temperature not higher than 0° C.

5. The glass fiber-reinforced thermoplastic resin as claimed in claim 4, wherein the aromatic vinyl monomer is selected from the group consisting of styrene and substituted styrenes substituted by a lower alkyl at its side chain and/or nucleus.

6. The glass fiber-reinforced thermoplastic resin as claimed in claim 4, wherein the rubbery polymer is selected from the group consisting of butadiene-based rubbery polymers.

7. The glass fiber-reinforced thermoplastic resin as claimed in claim 1, wherein the copolymer resin (B) comprises a maleimide monomer component as the component (B-3).

8. The glass fiber-reinforced thermoplastic resin as claimed in claim 7, wherein the maleimide monomer component is selected from the group consisting of maleimide and N-arylmaleimides.

9. The glass fiber-reinforced thermoplastic resin as claimed in claim 8, wherein the N-arylmaleimide is N-phenylmaleimide.

10. The glass fiber-reinforced thermoplastic resin as claimed in claim 1, wherein the unsaturated dicarboxylic acid anhydride (i) for the monomer (B-2) is selected from the group consisting of maleic anhydride and the unsaturated carboxylic acid, and its salt, ester, and amide are acrylic and methacrylic acids and their salts, esters and amides.

11. The glass fiber-reinforced thermoplastic resin as claimed in claim 1, wherein the aromatic vinyl copolymer resin (I-2) comprises the copolymer (C) wherein the aromatic vinyl monomer is selected from the group consisting of styrene and substituted styrenes substituted by a lower alkyl at its side chain and/or nucleus.

12. The glass fiber-reinforced thermoplastic resin as claimed in claim 1, wherein the binder (a) is such that the unsaturated dicarboxylic acid anhydride is maleic anhydride, the unsaturated carboxylic acid is selected from the group consisting of acrylic acid and methacrylic acid, and the unsaturated monomer is selected from the group consisting of styrene and methyl acrylate.

13. The glass fiber-reinforced thermoplastic resin as claimed in claim 1, wherein the binder (b) is such that the aromatic diisocyanate is selected from the group consisting of phenylene diisocyanate, tolylene diisocyanates, xylylene diisocyanates, and dimers thereof, and the polyol to react with the diisocyanate to form the polyurethane is selected from polyesters having hydroxyl groups at the both ends and polyethers having hydroxyl groups at the both ends.

14. The glass fiber-reinforced thermoplastic resin as claimed in claim 1, wherein the binder when it is used for preparing the glass fiber is in the form of an aqueous emulsion.

15. Glass fiber having a coat thereon of a binder which is a mixture of a polymeric binder component (a) or (b) and a silane binder component (c) as the binder:
(a) a polymeric binder component comprising a styrene-acrylonitrile copolymer comprising 50 to 95% by weight of a styrene monomer and 5 to 50% by weight of an acrylonitrile monomer and a copolymer comprising 5 to 50% by weight of an unsaturated dicarboxylic acid anhydride or an unsaturated carboxylic acid and 50 to 95% by weight of an unsaturated monomer;
(b) a polymeric binder comprising a polyurethane containing an aromatic diisocyanate as its constituent;
(c) a silane binder component comprising at least one of γ-aminopropyltriethoxysilane, N-β-(aminoethyl)-γ-aminopropyltriethoxysilane, and N-β-(aminoethyl)-N'-β'-(aminoethyl)-γ-aminopropyltriethoxysilane.

16. The glass fiber having a coat thereon of a binder as claimed in claim 15, wherein the binder (a) is such that the unsaturated dicarboxylic acid anhydride is maleic anhydride, the unsaturated carboxylic acid is selected from the group consisting of acrylic acid and methacrylic acid, and the unsaturated monomer is selected from the group consisting of styrene and methyl acrylate.

17. The glass fiber having a coat thereon of a binder as claimed in claim 15, wherein the binder (b) is such that the aromatic diisocyanate is selected from the group consisting of phenylene diisocyanate, tolylene diisocyanates, xylylene diisocyanates, and dimers thereof, and the polyol to react with the diisocyanate to form the polyurethane is selected from polyesters having hydroxyl groups at the both ends and polyethers having hydroxyl groups at the both ends.

18. The glass fiber having a coat thereon of a binder as claimed in claim 15, wherein the binder when it is used for preparing the glass fiber is in the form of an aqueous emulsion.

* * * * *